US010719329B2

(12) United States Patent
Vasekin et al.

(10) Patent No.: US 10,719,329 B2
(45) Date of Patent: Jul. 21, 2020

(54) APPARATUS AND METHOD FOR USING PREDICTED RESULT VALUES

(71) Applicant: Arm Limited, Cambridge (GB)

(72) Inventors: Vladimir Vasekin, Cambridge (GB); David Michael Bull, Cambridge (GB); Chiloda Ashan Senarath Pathirane, Cambourne (GB); Alexei Fedorov, Cambridge (GB)

(73) Assignee: Arm Limited, Cambridge (GB)

( * ) Notice: Subject to any disclaimer, the term of this patent is extended or adjusted under 35 U.S.C. 154(b) by 79 days.

(21) Appl. No.: 16/021,178

(22) Filed: Jun. 28, 2018

(65) Prior Publication Data

US 2020/0004547 A1 Jan. 2, 2020

(51) Int. Cl.
*G06F 9/38* (2018.01)
*G06F 21/64* (2013.01)
(Continued)

(52) U.S. Cl.
CPC ........ *G06F 9/3842* (2013.01); *G06F 9/30043* (2013.01); *G06F 9/3838* (2013.01);
(Continued)

(58) Field of Classification Search
None
See application file for complete search history.

(56) References Cited

U.S. PATENT DOCUMENTS 5,822,575 A * 10/1998 Tran .................... G06F 9/30058
712/239
5,845,103 A * 12/1998 Sodani .................. G06F 9/383
712/216
(Continued)

OTHER PUBLICATIONS

Zhou, P. etal., Fast Branch Misprediction Recovery in Out-of-order Superscalar Processors, 2005, ACM, pp. 41-50 (Year: 2005).*

*Primary Examiner* — Eric Coleman
(74) *Attorney, Agent, or Firm* — Nixon & Vanderhye P.C.

(57) ABSTRACT

An apparatus and method are provided for using predicted result values. The apparatus has a processing unit that comprises processing circuitry for executing a sequence of instructions, and value prediction circuitry for identifying a predicted result value for at least one instruction. A result producing structure is provided that is responsive to a request issued from the processing unit when the processing circuitry is executing a first instruction, to produce a result value for the first instruction and return that result value to the processing unit. While waiting for the result value from the result producing structure, the processing circuitry can be arranged to speculatively execute at least one dependent instruction using a predicted result value for the first instruction as obtained from the value prediction circuitry. The request issued from the processing unit includes a signature value indicative of the predicted result value, and the result producing structure references the signature value in order to detect whether a mispredict condition exists indicating that the predicted result value differs from the result value. The apparatus further provides a mispredict signal transmission path via which the result producing structure, when the mispredict condition is detected, can assert a mispredict signal for receipt by the processing unit prior to the result value being available to the processing unit. Such an approach can reduce the misprediction penalty associated with using a mispredicted result value.

20 Claims, 8 Drawing Sheets

(51) Int. Cl.
*G06F 9/30* (2018.01)
*G06F 9/54* (2006.01)

(52) U.S. Cl.
CPC ............ *G06F 9/3861* (2013.01); *G06F 9/542* (2013.01); *G06F 21/64* (2013.01)

(56) References Cited

U.S. PATENT DOCUMENTS

| | | | | |
|---|---|---|---|---|
| 6,836,841 | B1* | 12/2004 | Wu | G06F 8/36 |
| | | | | 712/220 |
| 7,340,567 | B1* | 3/2008 | Chou | G06F 12/0862 |
| | | | | 711/137 |
| 10,168,990 | B1* | 1/2019 | Annamalai | G06F 7/483 |
| 2003/0093648 | A1* | 5/2003 | Moyer | G06F 9/3877 |
| | | | | 712/34 |
| 2004/0260517 | A1* | 12/2004 | Ding | G06F 8/4442 |
| | | | | 702/186 |
| 2015/0301826 | A1* | 10/2015 | Sideris | G06F 9/30181 |
| | | | | 712/226 |
| 2016/0239307 | A1* | 8/2016 | Alexander | G06F 9/30043 |

\* cited by examiner

APPARATUS AND METHOD FOR USING PREDICTED RESULT VALUES

BACKGROUND

The present technique provides an apparatus and method for using predicted result values.

A processing unit may comprise processing circuitry for executing a sequence of instructions, and often the processing circuitry is arranged in a pipelined arrangement, so that a number of instructions can be in the process of being executed within the various stages of the pipeline. It is often the case that some instructions are dependent on the result of an earlier instruction, for example because they require as one of their source operands the result produced by that earlier instruction.

To seek to improve performance in such situations, it is known to provide value prediction circuitry that can maintain a predicted result value for one or more instructions. If a predicted result value is available for the earlier instruction mentioned above, this would allow the processing circuitry to start execution of one or more dependent instructions, based on use of the predicted result value. Later it is then necessary to verify that the predicted result value did in fact match the actual result value produced when the earlier instruction was executed, and if the prediction is wrong, the processing circuitry will then need to re-execute the dependent instructions.

Accordingly, there is a microarchitectural dependent penalty associated with a situation where a predicted result value is used, and that later turns out to be an incorrectly predicted result value, due to the number of extra cycles required to return the pipeline to the situation that was present before the mispredicted result value was used. This penalty associated with the use of a wrong predicted result value has to be balanced against the penalty incurred were the apparatus not to make use of predicted result values, and hence where the dependent instructions could not begin to be executed until the actual result value was available. In order to improve the benefits available from the use of predicted result values, it is desirable to reduce the penalty associated with the use of a mispredicted result value. However, it is often the case that predicted result values are used for instructions whose execution incurs a relatively long latency, for example load instructions that miss in one or more levels of cache, and in such situations it can be a significant period of time before the actual result value is available, and hence the situation of a misprediction of the result value can be determined.

SUMMARY

In a first example configuration there is provided an apparatus comprising: a processing unit comprising processing circuitry to execute a sequence of instructions, and value prediction circuitry used to identify a predicted result value for at least one instruction; a result producing structure, responsive to a request issued from the processing unit when the processing circuitry is executing a first instruction, to produce a result value for said first instruction and return the result value to the processing unit; the processing unit being arranged, whilst waiting for the result value from the result producing structure, to cause the processing circuitry to speculatively execute at least one dependent instruction using a predicted result value for the first instruction as obtained from the value prediction circuitry; the request from the processing unit including a signature value indicative of the predicted result value, and the result producing structure being responsive to the signature value to detect a mispredict condition indicating that the predicted result value differs from the result value; and the apparatus providing a mispredict signal transmission path via which the result producing structure, when the mispredict condition is detected, is arranged to assert a mispredict signal for receipt by the processing unit prior to the result value being available to the processing unit.

In another example configuration there is provided a method of using predicted result values in an apparatus having a processing unit comprising processing circuitry to execute a sequence of instructions, and value prediction circuitry used to identify a predicted result value for at least one instruction, comprising: causing a result producing structure, responsive to a request issued from the processing unit when the processing circuitry is executing a first instruction, to produce a result value for said first instruction and return the result value to the processing unit; whilst the processing unit is waiting for the result value from the result producing structure, causing the processing circuitry to speculatively execute at least one dependent instruction using a predicted result value for the first instruction as obtained from the value prediction circuitry; including within the request from the processing unit a signature value indicative of the predicted result value; causing the result producing structure to be responsive to the signature value to detect a mispredict condition indicating that the predicted result value differs from the result value; and employing a mispredict signal transmission path via which the result producing structure, when the mispredict condition is detected, asserts a mispredict signal for receipt by the processing unit prior to the result value being available to the processing unit.

In a yet further example configuration there is provided an apparatus comprising: a processing unit comprising processing means for executing a sequence of instructions, and value prediction means for identifying a predicted result value for at least one instruction; a result producing means for producing, responsive to a request issued from the processing unit when the processing means is executing a first instruction, a result value for said first instruction and for returning the result value to the processing unit; the processing unit being arranged, whilst waiting for the result value from the result producing means, to cause the processing means to speculatively execute at least one dependent instruction using a predicted result value for the first instruction as obtained from the value prediction means; the request from the processing unit including a signature value indicative of the predicted result value, and the result producing means, in response to the signature value, for detecting a mispredict condition indicating that the predicted result value differs from the result value; and the apparatus providing a mispredict signal transmission path via which the result producing means, when the mispredict condition is detected, is arranged to assert a mispredict signal for receipt by the processing unit prior to the result value being available to the processing unit.

BRIEF DESCRIPTION OF THE DRAWINGS

The present technique will be described further, by way of example only, with reference to examples thereof as illustrated in the accompanying drawings, in which.

DESCRIPTION OF EXAMPLES

Figure 1:
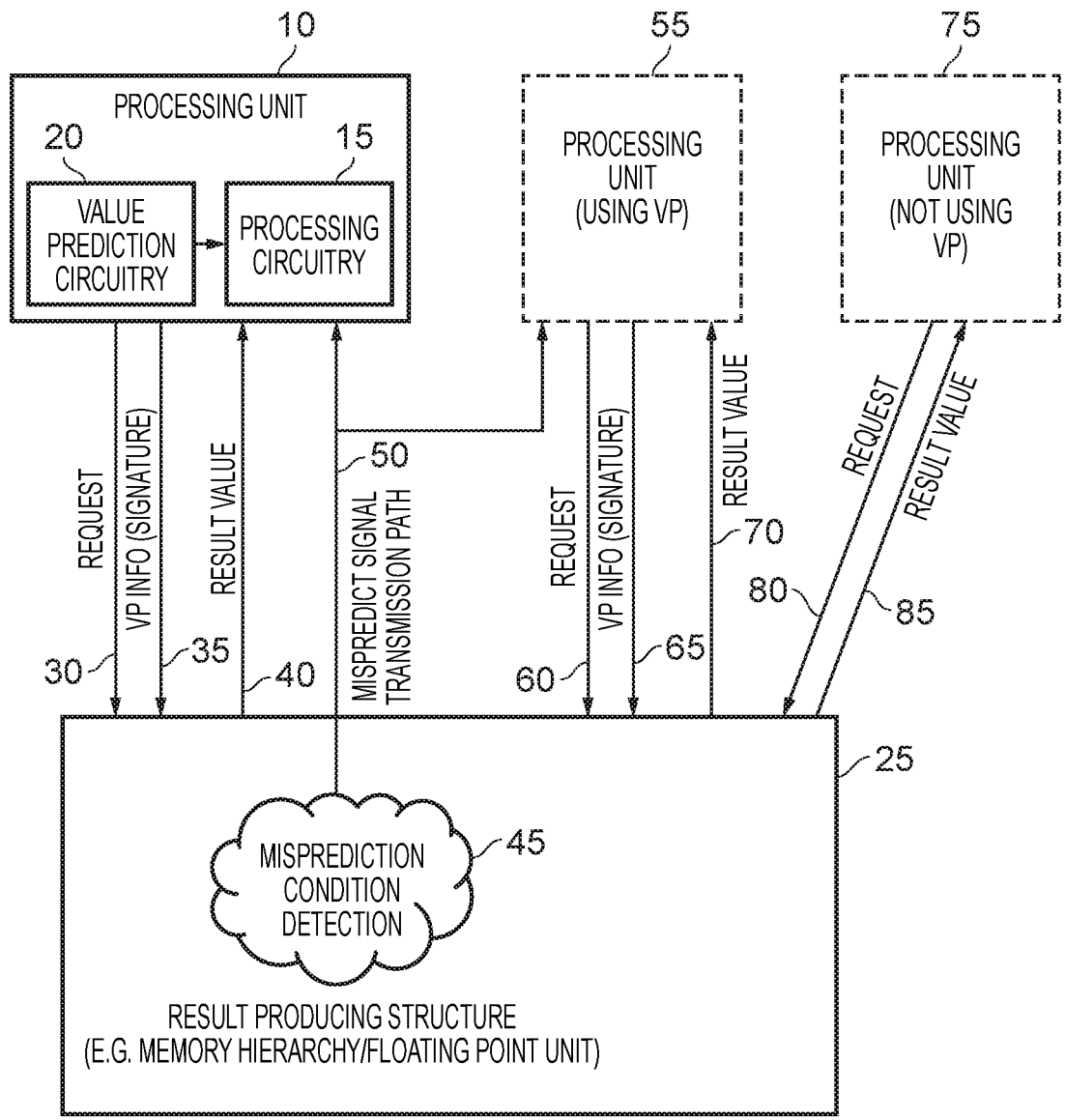
FIG. 1 is a block diagram of an apparatus in accordance with one example.

In one example configuration, an apparatus is provided that comprises a processing unit having processing circuitry to execute a sequence of instructions, and value prediction circuitry used to identify a predicted result value for at least one instruction. A result producing structure is also provided, which is referenced by the processing unit when executing certain instructions within the sequence. The result producing structure is arranged to be responsive to a request issued from the processing unit when the processing circuitry is executing a first instruction, and in particular in response to that request is then arranged to produce a result value for the first instruction and to return that result value to the processing unit.

There may be a significant number of cycles of delay between the processing unit issuing the request, and the result value being returned from the result producing structure. Whilst waiting for the result value from the result producing structure, the processing unit may be arranged to cause the processing circuitry to speculatively execute at least one dependent instruction (i.e. an instruction whose computation is dependent upon the result value produced for the first instruction) using a predicted result value for the first instruction as obtained from the value prediction circuitry.

As mentioned earlier, a check needs to be performed in due course once the result value for the first instruction is available, to check that the predicted result value was in fact correct, and if not any dependent instructions that have been speculatively executed using that predicted result value will need to be re-executed. There will accordingly be a time penalty incurred in situations where the predicted result value proves to be incorrect. The techniques described herein provide a mechanism which can reduce that time penalty, hence increasing situations where the use of predicted result values can provide a net overall benefit in performance.

In particular, the request from the processing unit is arranged to include a signature value that is indicative of the predicted result value, and the result producing structure is responsive to the signature value to detect whether a mispredict condition is present indicating that the predicted result value differs from the actual result value. Further, a mispredict signal transmission path is provided within the apparatus via which the result producing structure, when the mispredict condition is detected, is arranged to assert a mispredict signal for receipt by the processing unit prior to the result value being available to the processing unit.

The mispredict signal transmission path can be arranged to be an entirely separate path to the path used to return the result value to the processing unit, and in one example is a dedicated path provided for the mispredict signal. The mispredict signal transmission path can be constructed in a simple manner, and avoid some of the complexities (such as buffer circuits and the like) that may be required in connection with the result value return path. Indeed, since the processing unit will operate in a functionally correct manner irrespective of whether a mispredict signal is received or not in situations where the result value is mispredicted, since in any event it will be able to detect the misprediction in due course once the actual result value is made available to it, the mispredict signal transmission path can be arranged in a manner that can ensure a fast propagation of asserted mispredict signals, whilst avoiding the need to insert robust mechanisms into the transmission path to ensure that in all instances an asserted mispredict signal will be returned to the processing unit. This for example can mean that, in situations where multiple asserted mispredict signals are in the process of being returned via the mispredict signal transmission path, the circuitry provided to handle contention in the use of the mispredict signal transmission path can be kept very simple, and indeed in some instances can merely discard certain asserted mispredict signals. Such measures can ensure the mispredict signal transmission path can be optimised for speed, and in particular can enable an asserted mispredict signal to be received by the processing unit significantly in advance of the result value that needs to be returned via an appropriate data value propagation path.

The signature value can take a variety of forms. For example, it could be the full predicted result value if desired. Alternatively, it can be a value represented in a smaller number of bits than the full predicted result value, but being indicative of the predicted result value. Indeed, there is no requirement for the signature value to be uniquely associated with the predicted result value, and instead a representation can be used that enables a quick assessment to be made as to the likelihood of the predicted result value being different to the actual result value, with that situation being determined to give rise to the mispredict condition and the assertion of the mispredict signal. In combination with the mispredict signal transmission path, this enables an early indication to be returned to the processing unit of a situation where the predicted result value appears to be incorrect, allowing the processing unit to take steps to reduce the penalty associated with such a misprediction.

However, it is not a requirement that the asserted mispredict signal is fully accurate all of the time. In particular, if the generation of the mispredict signal, and the propagation of the mispredict signal via the mispredict signal transmission path, is such that in some instances some mispredictions are not notified to the processing unit, or in some instances a mispredict signal is asserted when in fact the predicted result value did not differ from the actual result value, this does not affect functional correctness of execution of instructions by the processing unit. However, provided the use of the asserted mispredict signal and return of that signal via the mispredict signal transmission path serves to provide an early indication of a significant number of instances where the predicted result value is mispredicted, then this can enable a significant improvement in processing performance, by enabling the processing unit to take steps to correct for the misprediction (by returning the processing unit to a state where the dependent instructions can be re-executed using the actual result value) earlier than would be the case had it needed to wait for the actual result value to be returned before it could determine the presence of the misprediction.

The result producing structure can take a variety of forms. In one example, it comprises a plurality of stages where the signature value is analysed to determine whether the mispredict condition is detected, and the mispredict signal transmission path enables the mispredict signal to be asserted by any of those plurality of stages. This may mean that in some instances different requests from the processing unit are in the process of being considered by different stages in the result producing structure, and as a result it is possible for mispredict signals to be asserted from multiple of the stages, potentially at the same time. In one example implementation, the mispredict signal transmission path is arranged to combine outputs from the plurality of stages to provide a single mispredict input to the processing unit. In situations where multiple asserted mispredict signals are vying for use of the same portion of the mispredict signal transmission path at the same time, suitable structures can be put in place to deal with such conflicts. This could for example include certain prioritisation schemes, and if desired buffering of one of more asserted mispredict signals. However, as discussed earlier, there is no requirement that all asserted mispredict signals need to be returned to the processing unit, and accordingly in other implementations, in order to keep the mispredict signal transmission path circuitry simple, and hence improve speed, no buffering circuitry may be provided, and instead certain asserted mispredict signals can merely be dropped from onward propagation if necessary in order to deal with conflict situations.

There are a number of ways in which the processing unit may seek to match asserted mispredict signals received from the result producing structure with corresponding requests that it has issued to the result producing structure. In a simple case, this may merely work on an assumption that a received asserted mispredict signal relates to the oldest request for which a result value is predicted, and for which the actual result value is still awaited. However, if desired, the request from the processing unit may include an identifier value to assist in matching asserted mispredict signals with requests issued by the processing unit, and in that instance the asserted mispredict signal may indicate the identifier value so that it can be compared with the identifier value used in the request.

In situations where the result producing structure does not detect presence of the mispredict condition, it could in principle provide notification of that determination back to the processing unit. However, in one example implementation, in the absence of the mispredict condition being detected, no response is provided to the processing unit over the mispredict signal transmission path. In particular, there is no need to provide this information to the processing unit, as it would not alter the steps being undertaken by the processing unit to speculatively execute the dependent instructions, and in due course the processing unit will make a determination as to whether the predicted result value matches the actual result value based on the actual result value as returned from the result producing structure.

As mentioned earlier, the signature value can take a variety of forms. In one example, the signature value is non-unique for the predicted result value, and assertion of the mispredict signal provides a misprediction hint to the processing unit. In particular, because the signature value is non-unique, there may be situations where the signature value provided in the request and a corresponding signature value determined by the result producing structure for the actual result value may match even though the predicted result value is not the same as the actual result value, or indeed may indicate that the predicted result value does not match the actual result value, even though in fact it does.

The signature value can take a variety of forms, but in one example implementation is a cyclic redundancy check (CRC) code generated from the predicted result value, and the result producing structure is arranged to compare the CRC code included in the request with a CRC code for the result value in order to detect whether the mispredict condition is present. The use of a CRC code can provide a particularly efficient implementation, particularly when used in association with certain types of result producing structure. For example, when the result producing structure is a memory hierarchy comprising memory structures for holding data, those memory structures may already include CRC codes in association with the data values stored therein, and accordingly for a data value being accessed within the result structure to form the actual result value, the corresponding CRC code in the memory structure can be used to compare with the CRC code provided in the request (i.e. the CRC code that is indicative of the predicted result value), in order to determine whether to assert the mispredict signal or not. This avoids the need to separately generate the corresponding signature value within the result producing structure.

In one example implementation the processing unit may be arranged to use multiple predicted result values at the same time, so as to allow dependent instructions that are dependent on multiple different instructions to be in the process of being speculatively executed based on those predicted result values.

As a result, it is possible that a number of mispredict signals may be asserted at the same time, or at least need to potentially use a portion of the mispredict signal transmission path at the same time. Whilst as mentioned earlier it would be possible to add buffer structures into the mispredict signal transmission path so that certain asserted signals can be buffered until there is space to transmit them, in an alternative embodiment it is possible merely to allow certain asserted mispredict signals to be dropped from onward propagation to the processing unit, in order to simplify the structure of the mispredict signal transmission path. Hence, in one example implementation, the mispredict signal transmission path may be arranged to allow one or more asserted mispredict signals to be suppressed in order to avoid conflict for use of at least a portion of the mispredict signal transmission path by multiple asserted mispredict signals.

In one example, the apparatus may include multiple processing units, that each have processing circuitry for executing a sequence of instructions, and value prediction circuitry used to identify a predicted result value for at least one of those instructions. The result producing structure may then be shared by those multiple processing units, with the mispredict signal transmission path being arranged to assert mispredict signals to each of the processing units.

Whilst the mispredict signal transmission path could be arranged so as to essentially provide a dedicated path back to each processing unit, in one example implementation the mispredict signal transmission path comprises at least one path portion that is used to transmit an asserted mispredict signal irrespective of which of the processing units is the intended recipient for that asserted mispredict signal.

In one particular implementation, each asserted mispredict signal may be broadcast to each of the processing units.

In such instances, an identifier included in the request received by the result producing structure may be indicated in the asserted mispredict signal to enable each processing unit to determine whether that asserted mispredict signal is associated with a request issued by that processing unit. For example, each processing unit could have a different ID, to enable individual processing units to identify the asserted mispredict signals that are relevant to it. In other embodiments, there may be more than a single identifier used by each processing unit, so as to allow an individual processing unit to match the asserted mispredict signals destined for it with particular requests that it has issued.

The result producing structure can take a variety of forms, but in one example implementation is a memory hierarchy and the first instruction is a load instruction executed to load the result value from the memory hierarchy into a storage element of the processing unit. Such load instructions can potentially have a long latency, and accordingly are good candidates for having a predicted result value provided for them in the value prediction circuitry.

In one example implementation the memory hierarchy comprises multiple levels, and one or more of the levels comprises analysis circuitry to seek to determine, with reference to the signature value, whether the mispredict condition is present. Such analysis circuitry could for example be provided at each of the levels if desired, or alternatively one or more of the levels may not make use of the signature value provided in the request, and perform no such analysis. Accordingly those levels would not be arranged to assert a mispredict signal, but other levels that do comprise analysis circuitry will be arranged to perform analysis and issue asserted mispredict signals as required. The signals from the various levels can then be combined within the mispredict signal transmission path to provide a response back to the processing unit via the mispredict signal transmission path. The one or more levels that comprise the analysis circuitry can take a variety of forms, and could for example include a level of cache and/or main memory.

At various levels of the memory hierarchy, buffer circuitry may be provided in association with pending load requests that are awaiting processing by that level of memory. In one example implementation, for at least one of the levels the analysis circuitry may be arranged to selectively bypass such buffer circuitry associated with pending load requests, so as to enable an earlier detection to be made as to whether storage at that level holds the result value. In situations where it does hold the result value, then the signature value for that result value can be compared with the signature value provided in the request to determine whether to assert a mispredict signal or not. By providing the possibility to selectively bypass the buffer circuitry, this means that the analysis required to determine whether to assert the mispredict signal need not be held up by ongoing accesses required into the storage structures at that level of the memory hierarchy to process ongoing load requests, and instead the analysis circuitry can make use of periods where a particular memory structure that needs to be accessed (e.g. a particular RAM (random access memory) structure) is not required by the ongoing load operations, to perform the required lookup to initiate the analysis process.

Whilst in one example discussed above the result producing structure is a memory hierarchy, the result producing structure can take other forms in other implementations. For example, the result producing structure may be computation circuitry used to perform an operation required by the first instruction. For instance, in certain processor designs, it is known to provide dedicated units to perform particular types of computations, with those computations being offloaded to those dedicated units by the general processing unit. As a particular example, the computational circuitry may be a floating point unit used to perform floating point operations on behalf of the processing unit.

Particular examples will now be described with reference to the Figures.

FIG. 1 is a block diagram of an apparatus in accordance with one example. A processing unit 10 is provided that has processing circuitry 15 for executing a sequence of instructions. The processing circuitry 15 includes an execution pipeline consisting of multiple pipeline stages, which enables multiple instructions to be "in flight" (i.e. in the process of being executed) at the same time within different stages of the pipeline. The processing circuitry 15 also includes dispatch circuitry for determining when to dispatch instructions into the execution pipeline for execution.

It is often the case that some instructions are dependent on the result of an earlier instruction, and hence potentially need to be held in the dispatch stage until the result of the earlier instruction is available. However, to seek to alleviate this requirement, value prediction circuitry 20 is provided that, for at least certain types of instructions, aims to maintain a predicted result value for those instructions, which can enable certain dependent instructions to be speculatively executed earlier than they would otherwise be able to be executed, by making use of the predicted result value obtained in relation to the earlier instruction upon which they are dependent. Once the actual result value is later available for the earlier instruction, the processing circuitry can then verify that the predicted result value did in fact match the actual result value, and if it did not, the processing circuitry can then take steps to place the pipeline back into the state it was prior to the predicted result value being used, so that affected dependent instructions can be re-executed using the actual result value for the earlier instruction.

In accordance with the techniques described herein, one type of instruction for which the value prediction circuitry 20 seeks to maintain a predicted result value is an instruction that requires access to a result producing structure 25 in order to obtain the actual result value. In that instance, the processing circuitry 15 will issue a request over path 30 to the result producing structure 25, and in due course once the result value has been determined by the result producing structure, that result value will then be returned over path 40 to the processing circuitry. When such an instruction is first executed, it may be determined that it is suitable to allocate an entry in the value prediction circuitry 20 for that instruction, and accordingly when the actual result value is returned over path 40, an entry can be made within a storage structure within the value prediction circuitry 20 to identify that result value as the predicted result value for the instruction, so that when the instruction is subsequently encountered (in some implementations the value prediction circuitry may not allow use of the predicted result value until there is some confidence as to its accuracy, for example by observing that it is the correct result for a number of occurrences of the instruction), the predicted result value can be used to allow an earlier dispatch of any dependent instructions into the execution pipeline using that predicted result value. In situations where the predicted result value is accurate, this can significantly increase performance.

As will be understood by those skilled in the art, value prediction circuits can include incrementing or decrementing structures so that when regular patterns are observed in the result values returned for iterative execution of a particular instruction, the predicted result value can be provided taking into account such regular patterns.

Due to the fact that the result producing structure 25 needs to be accessed to obtain the result value, it will be appreciated that a significant latency can arise before the result value is available to the processing circuitry over path 40. It is only once the result value is available that the processing circuitry would then be able to verify whether the predicted result value was in fact correct, and if not then begin the steps necessary to re-execute the dependent instructions. This can significantly impact the penalty associated with the use of a mispredicted result value. In accordance with the techniques described herein, a mechanism is provided that enables an earlier indication of the use of a mispredicted result value to occur, allowing the processing circuitry to begin the necessary steps to re-execute the dependent instructions earlier than would be the case if it had to await receipt of the result value.

In particular, when the request for the result value is issued over path 30, it can be accompanied by value prediction information (VPinfo) over path 35. This value prediction information can identify to the result producing structure 25 that a prediction of the result value is being used by the processing circuitry 15, and can also provide an indication of that predicted result value in the form of a signature value. The signature value could be the predicted value itself, or alternatively could be some reduced size representation that is indicative of the predicted result value, for example a CRC code.

When the result producing structure 25 processes the request, it can be arranged in situations where the VPinfo is provided over path 35 to apply a misprediction condition detection operation 45 in order to seek to detect with reference to the signature value whether the predicted result value appears to have been mispredicted or not. In particular, the signature value can be compared with a corresponding signature value associated with the actual result value in order to provide an indication of whether misprediction has arisen or not. In the event that it is determined that there appears to be a misprediction in the predicted result value, then an asserted mispredict signal can be issued over a mispredict signal transmission path 50 back to the processing unit 10. The mispredict signal transmission path 50 can be arranged to be an entirely separate path to the path 40 used to return the result value to the processing unit, and indeed in one example implementation may be a dedicated path provided solely for transmission of the mispredict signal back to the processing unit 10. The mispredict signal transmission path can hence be constructed in an optimised manner, aimed at allowing an asserted mispredict signal to be routed back to the processing unit as quickly as possible. It can be arranged to avoid some of the complexities such as buffer circuits and the like, that may be required in connection with the result value return path. In particular, whilst the result value path 40 needs to ensure that there will be no loss of data returned to the processing unit, this is not a requirement for the mispredict signal transmission path, since irrespective of whether the processing unit receives an asserted mispredict signal or not, it will still operate functionally correctly. For example, if a mispredict signal condition is detected within the result producing structure, but the asserted mispredict signal is ultimately not received by the processing unit 10, the processing unit will still in due course be able to assess the misprediction when the result value is returned over path 40.

Accordingly, the mispredict signal transmission path 50 can be arranged in a way that optimises speed of transmission back to the processing unit, whilst relaxing certain constraints. For example, it can be acceptable for the mispredict signal transmission path to drop an asserted mispredict signal, such that it is not returned back to the processing unit in some situations. Further, the mispredict signal transmission path can be shared between several processing units that use value prediction, such as the processing unit 55 shown in FIG. 1. In particular it can be seen that that processing unit 55 has its own request 60 and result value return 70 paths, and is able to route VPinfo over path 65 in association with the request issued over path 60. However, it can share the same mispredict signal transmission path 50 that is used for the processing unit 10.

As indicated in FIG. 1, not all of the processing units within the apparatus need necessarily to use value prediction, and hence there may for example be a processing unit 75 provided within the apparatus. That processing unit will still have its own associated request and result value paths 80, 85, but does not make use of the value prediction mechanisms described herein. Indeed, whilst not shown, it is also possible that a processing unit may be provided that does make use of value prediction circuitry, but does not utilise the early mispredict mechanisms described herein.

As will be discussed further herein, since it is allowed that the mispredict signal transmission path can drop certain responses in some situations, the arbitration mechanism provided within the mispredict signal transmission path to arbitrate between multiple asserted mispredict signals can be kept relatively simple, and further the need for buffering circuitry can be avoided.

The result producing structure 25 can take a variety of forms. For example, it can be a memory hierarchy, such as one or more levels of cache and main memory, where one or more of those levels is able independently to assess the presence of the misprediction condition based on the provided VPinfo. The outputs from the various levels can then be merged into a single path returned to the processing unit 10, 55. Not all of the levels of the memory hierarchy need necessarily employ the misprediction condition detection operation 45, and indeed certain levels may merely pass on the VPinfo to the next level down without performing any analysis themselves.

As another example, the result producing structure may be computation circuitry used to perform an operation on behalf of the processing unit 10. For instance, in certain processor designs, it is known to provide dedicated units to perform particular types of computations, with those computations being offloaded to those dedicated units by the general processing units. Hence, in situations where the processing units 10, 55 are such general processing units, the result producing structure 25 may for example be one of those types of computation circuitry, a particular example being a floating point unit used to perform floating point operations on behalf of the processing units 10, 55.

Figure 2:
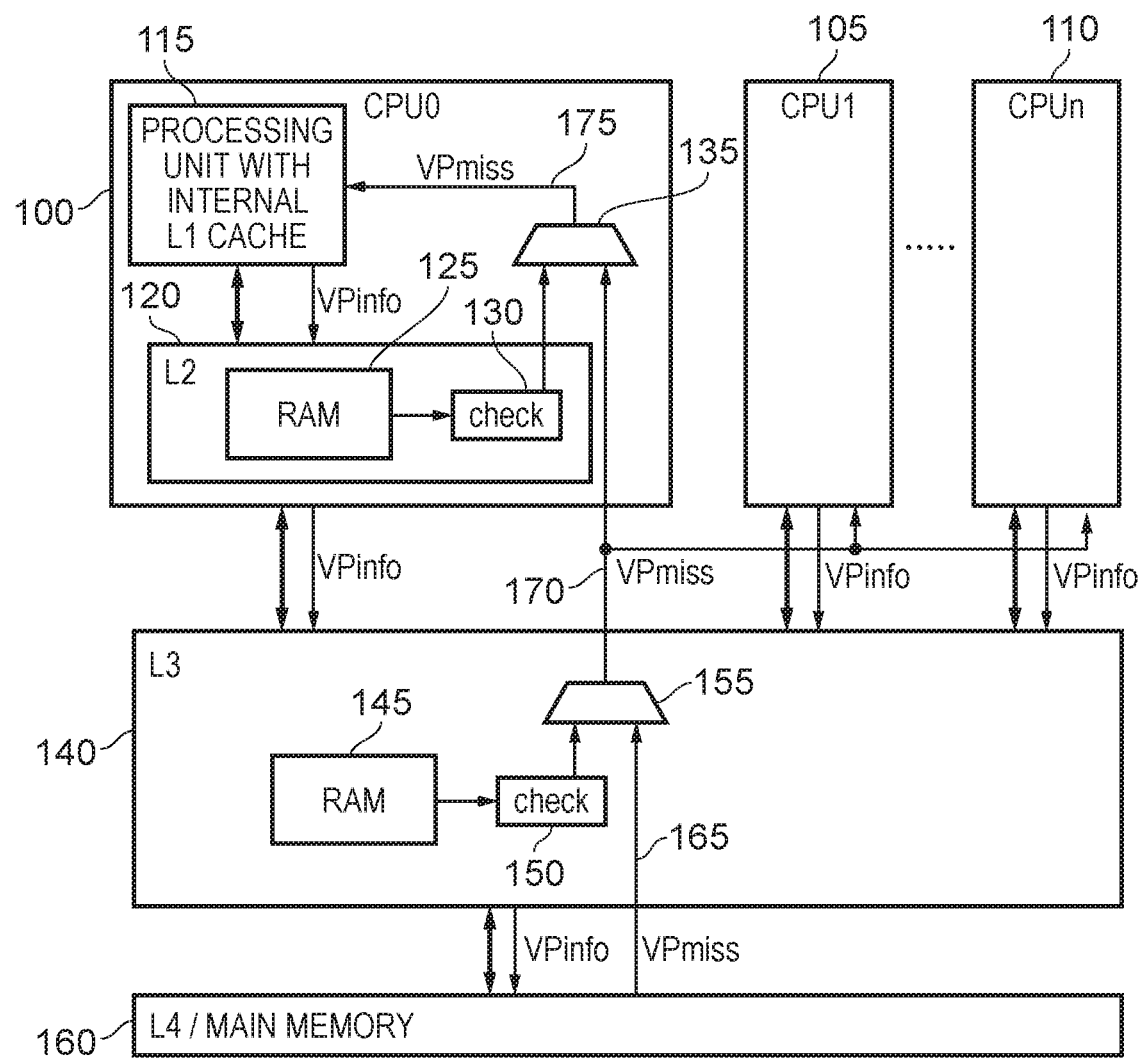
FIG. 2 is a diagram illustrating a particular example where the result producing structure comprises multiple levels of a memory hierarchy.

FIG. 2 illustrates a particular example arrangement where the result producing structure is a memory hierarchy. In this example, the element 115 within CPU 100 can be considered analogous to the processing unit 10 shown in FIG. 1, and includes both the processing unit, value prediction circuitry and an internal level 1 cache. The value prediction circuitry 20 within the processing unit 115 is arranged to allocate entries for load instructions that miss within the level 1 cache, and hence require propagation of a load request onto the lower levels of the memory hierarchy, starting with the level 2 cache 120. In this instance, three CPUs 100, 105, 110 are shown, and it is assumed in this instance that each of those CPUs are arranged in the same way as shown for CPU 100, and hence have their own level 1 and level 2 caches. However, this need not necessarily be the case, and in some other implementations the level 2 cache structure may be shared amongst the CPUs.

As shown, in this example, when a load instruction is executed and misses within the internal level 1 cache of the processing unit 115, a request is propagated onto the level 2 cache 120, and at the same time value prediction information is provided. In particular, this indicates whether the processing unit is operating using a predicted result value for the load instruction that is the subject of the request, and in that instance provides additional information, in particular a signature value used to provide an indication of the predicted result value. If desired, the value prediction information (VPinfo) may also include some form of identifier that in due course can be returned in association with any asserted mispredict signal back to the processing unit 115, to assist the processing unit in matching the asserted mispredict signal with the request that it has issued. Alternatively, or in addition, the ID information may assist in distinguishing between the requests issued by the different CPUs 100, 105, 110, since as shown in the example of FIG. 2 the mispredict signal transmission path 165, 170, 175 includes certain portions (e.g. the portions 165, 170) that are shared between the CPUs, and accordingly ID information can be used by the individual processing units to determine whether an asserted mispredict signal is destined for it or a different processing unit.

In situations where the VPinfo associated with the request indicates that the processing unit is making use of a predicted result value, then the storage structure within the level 2 cache 120, in this case the RAM 125, can be accessed in order to determine whether the required data value is stored within the level 2 cache, and if so a signature value for that data can be produced and passed to the check circuitry 130, where it can be compared with the signature value contained within the VPinfo provided by the processing unit.

Whilst the signature value can take a variety of forms, in one particular example it is a CRC code, and the RAM structure 125 may include a CRC RAM portion that maintains CRC information for the data values stored therein. Hence, if a hit is detected within the RAM structure 125 for the data being requested by the processing unit, the associated CRC value can be output to the check circuitry 130 for comparing with the CRC value provided in the VPinfo from the processing unit. In the event of a match being detected by the check circuitry, no further action is required, but if the CRC codes are different, this indicates presence of a misprediction condition, and results in an asserted mispredict signal being routed back to the processing unit via the multiplexer 135 and the path portion 175 of the mispredict signal transmission path.

If there is a miss within the level 2 cache, then the request will be propagated onto the level 3 cache 140, along with the associated VPinfo. As shown in FIG. 2, a similar process to that discussed above with reference to the level 2 cache can then be performed, involving a lookup within the associated RAM structure 145, and in the event of a hit, a comparison of the CRC codes by check circuitry 150. In the event that a hit is detected in the level 3 cache, and the CRC codes are different, then an asserted mispredict signal can be returned back to the processing unit 115 via the multiplexers 155, 135 and the path portions 170, 175 of the mispredict signal transmission path. This process can continue through the other levels of the memory hierarchy, including main memory, as illustrated schematically by the block 160 in FIG. 2.

Whilst the result value itself needs to be returned back through the full data value propagation path (indicated by the bidirectional arrows between the various memory hierarchy levels in FIG. 2), the asserted mispredict signal can be returned via the speed optimised path shown schematically by the elements 165, 155, 170, 135, 175. The mispredict signal transmission path can be significantly simplified with respect of the data value transmission path, since it is not required to ensure that every asserted mispredict signal is received one hundred percent of the time. As a result it can apply simple arbitration policies at the various multiplexing structures 135, 155, for example favouring responses (i.e. mispredict signals) from certain levels of the memory hierarchy over other levels of the memory hierarchy, and indeed need not buffer any non-selected response if desired. Instead, any non-selected response can merely be discarded, in order to ensure that structures are not placed within the mispredict signal transmission path that would reduce the speed of signals being returned to the processing unit. Further, the mispredict signal transmission path structure can be kept relatively simple by broadcasting information back to the various CPUs 100, 105, 110, rather than providing dedicated mispredict signal transmission paths for each of the CPUs.

In addition, it will be appreciated that the checking process 130, 150 does not need to be one hundred percent accurate. In particular, there is no requirement for an absolute detection of misprediction, and as a result simplified signature values such as the CRC values mentioned above can be used. If the result of the check process is occasionally not accurate, this does not affect functional correctness of the processing units, since in any event they will in due course determine in absolute terms whether the predicted result value was the same as the actual result value, when the actual result value becomes available to them. However, the simplified checking procedures, along with the optimised mispredict signal transmission path, can ensure that an asserted mispredict signal is received back at the processing unit significantly ahead of the actual result value, enabling the processing unit to take earlier steps to seek to re-execute dependent instructions in situations where an asserted mispredict signal is received. Provided the asserted mispredict signal is accurate most of the time, this can provide significant performance benefits, by reducing the penalty associated with the use of a mispredicted result value.

Whilst in FIG. 2 the use of the VPinfo, and the associated checking process, is shown as being performed at each level of the memory hierarchy, there is no requirement for every level of the memory hierarchy to perform the check process. For example, the level 3 cache 140 may be arranged not to use the check process, and instead the VPinfo will merely be propagated onto the other levels of the memory hierarchy 160 in the event of a cache miss within the level 3 cache, and no check will be performed within the level 3 cache itself.

Figure 3:
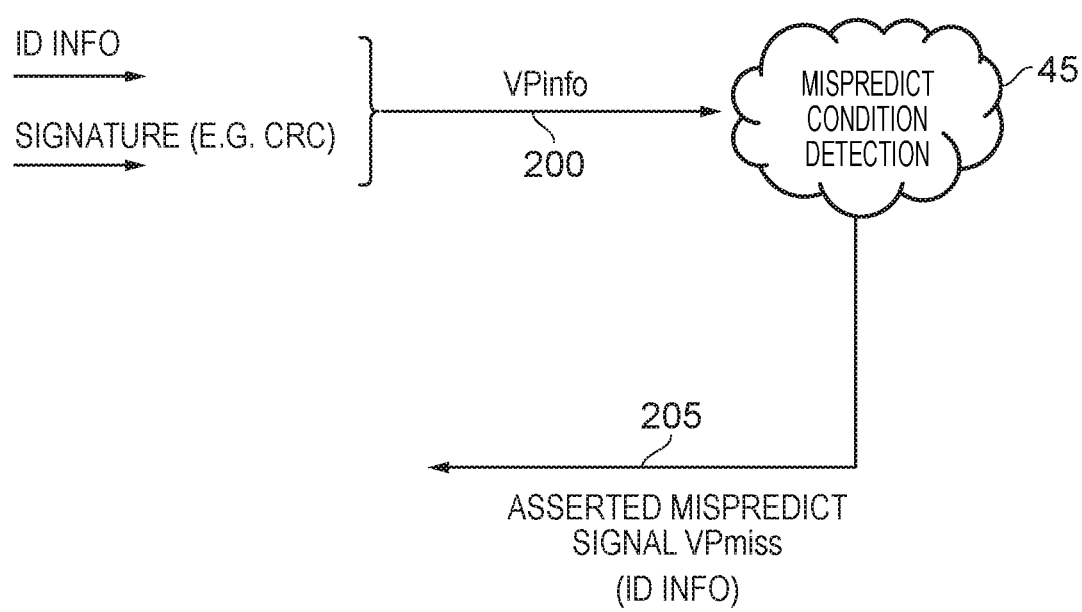
FIG. 3 illustrates information that may be included within the VPinfo and VPmiss signals of FIG. 2 in one example.

FIG. 3 schematically illustrates certain information that can be included within the VPinfo and VPmiss signals shown in FIG. 2, in one particular implementation. As shown in FIG. 3, the VPinfo 200 can include ID information to enable the processing unit to match asserted VPmiss signals with requests that it has issued, and a signature value that is indicative of the predicted result value that is being used, for example a CRC code. In some embodiments, it may be that the VP info signal is only asserted when a predicted result value is being used, or alternatively the VPinfo signal may always be passed, but a control bit may be added which is set to identify when the information is valid (i.e. a prediction is being made), and is cleared in situations where no prediction is being made and accordingly the VPinfo can be ignored.

When the mispredict condition detection operation 45 is performed, then if it is detected that the mispredict condition is present, the asserted mispredict signal VPmiss 205 will include the ID information that was contained in the original VPinfo 200, hence enabling the processing unit to determine whether the asserted mispredict signal relates to it, and potentially which of its requests that asserted mispredict signal relates to. For instance, in a simple case the ID info may merely be sufficient to distinguish between the various CPUs 100, 105, 110. However, in situations where certain CPUs may have multiple requests in flight at the same time, each of which are using different predicted result values, then it may be useful to supplement the ID information with additional information that will enable the processing unit to distinguish between the various requests that it has issued, so as to match asserted mispredict signals received with particular requests.

Figure 4:
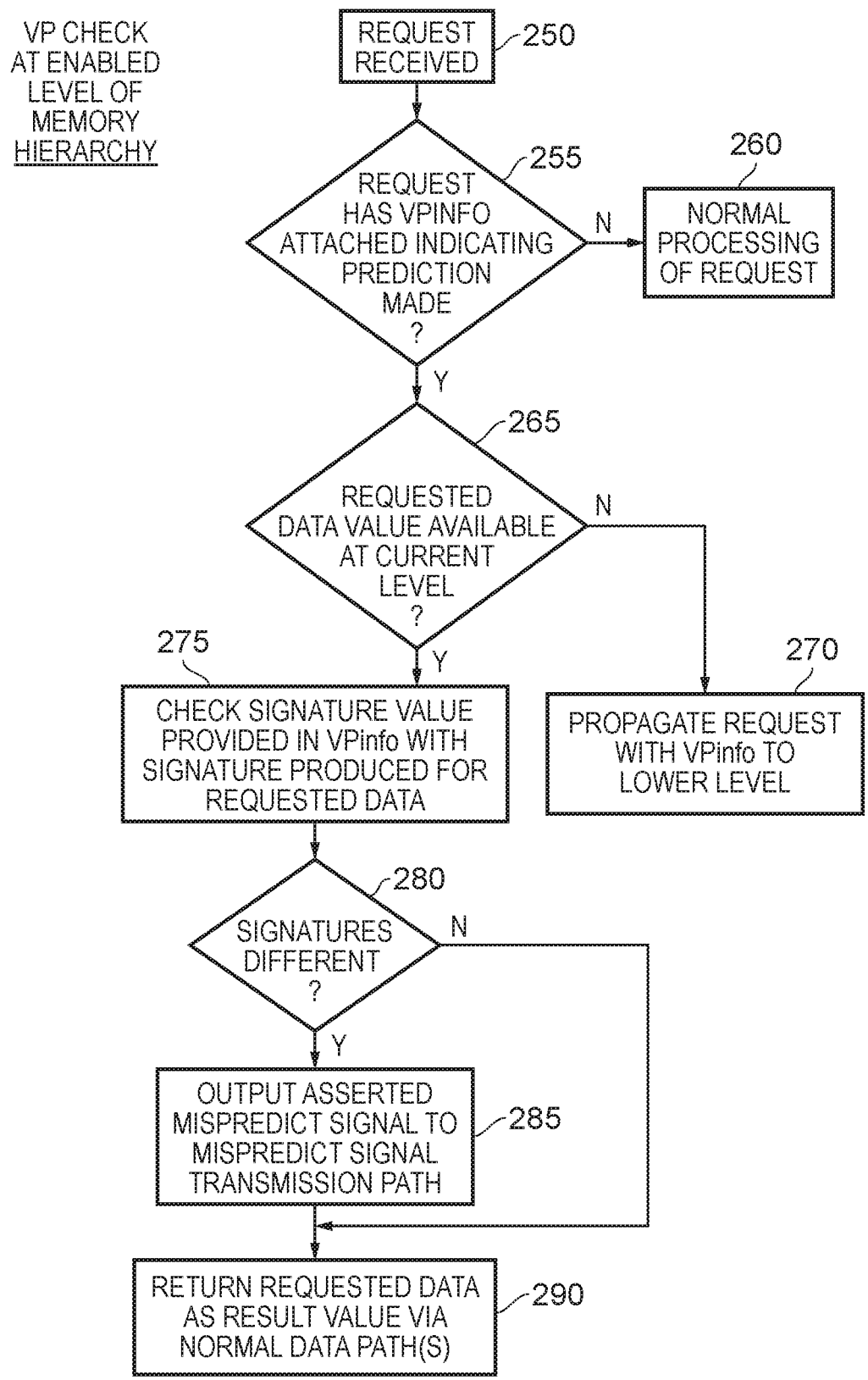
FIG. 4 is a flow diagram illustrating a value prediction check that may be performed at an enabled level of the memory hierarchy in accordance with one example.

FIG. 4 is a flow diagram illustrating the steps performed as part of the check process 130, 150 at an enabled level of the memory hierarchy of FIG. 2, in accordance with one particular implementation. At step 250, a request is received from a higher level of the memory hierarchy, and then at step 255 it is determined whether the request has VPinfo attached that indicates that a prediction has been made of the result value. If not, then the request is processed as normal at step 260, and no check process needs to be implemented. This will result in due course in the required data value being returned to the processing unit.

However, if it is determined at step 255 that the request does have VPinfo attached that indicates that a result prediction has been made, then at step 265 it is determined whether the requested data value is available at the current level of the memory hierarchy. If not, then the request is propagated on to the lower level of the memory hierarchy along with the associated VPinfo at step 270. However, if the requested data value is available at the current level, then at step 275 the signature value provided in the VPinfo is checked against the signature value produced for the requested data. As mentioned earlier, this may merely involve in one example implementation comparing the CRC code provided in the VPinfo with the CRC code stored in the relevant RAM structure in association with the data value. It is then determined at step 280 whether the signature values are different.

If the signature values are not different, then this indicates that the predicted result value is correct, and accordingly the process proceeds directly to step 290 where the requested data value is returned as the result value via the normal data return path(s). This may involve routing the data through the higher levels of the memory hierarchy, and through any buffering structures that are required to ensure that no data is lost in the return path.

However, if it is determined at step 280 that the signature values are different, then this indicates presence of the mispredict condition, and accordingly at step 285 an asserted mispredict signal is output onto the mispredict signal transmission path. As discussed earlier, this can include any ID info that was provided within the relevant VPinfo from the processing unit, to assist the processing unit in matching the asserted mispredict signal with the request that it has issued. The process then proceeds to step 290 where the data value is also returned via the normal data path(s).

Figure 5:
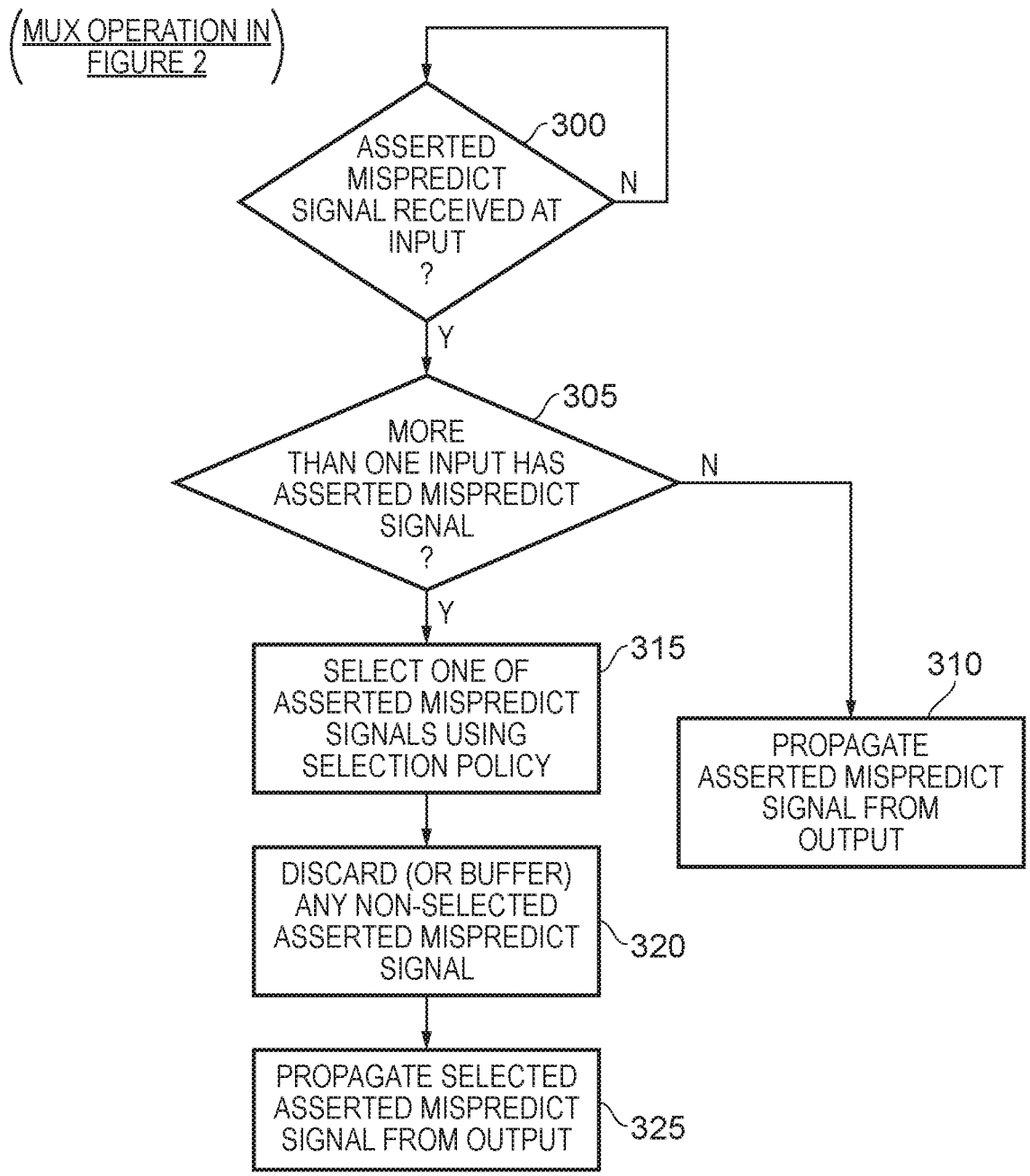
FIG. 5 is a flow diagram illustrating routing control that may be performed within the mispredict signal transmission path in accordance with one example.

FIG. 5 is a flow diagram illustrating routing control that may be employed within the mispredict signal transmission path, for example in association with each of the multiplexers 135, 155 shown in FIG. 2. At step 300, it is determined whether an asserted mispredict signal has been received at an input of the multiplexer. Once an asserted mispredict signal has been received, then it is determined at step 305 whether more than one input has an asserted mispredict signal. If not, then at step 310 the multiplexer merely propagates the asserted mispredict signal from its output.

However, if it is determined that more than one of the inputs have an asserted mispredict signal at step 305, then at step 315 one of the asserted mispredict signals is selected using an appropriate selection policy. The selection policy can take a variety of forms, but could be a simple level based priority scheme that favours an input from a particular level of the memory hierarchy over an input from another level of the memory hierarchy. For example, it could favour an input from a lower level of the memory hierarchy over one from a higher level of the memory hierarchy, for instance because it will typically be the case that a data value detected at a lower level of the memory hierarchy is going to take a longer period of time to be returned to the processing unit.

Once one of the asserted mispredict signals have been selected, then any non-selected asserted mispredict signal could merely be discarded at step 320, since there is no requirement for all asserted mispredict signals to ultimately be provided back to the relevant processing unit. However, if desired, some buffering circuitry could be added to enable any non-selected asserted mispredict signal to be locally buffered, so that it can then be propagated on in a later clock cycle.

At step 325, the selected asserted mispredict signal is then propagated from the output of the multiplexer.

Figure 6:
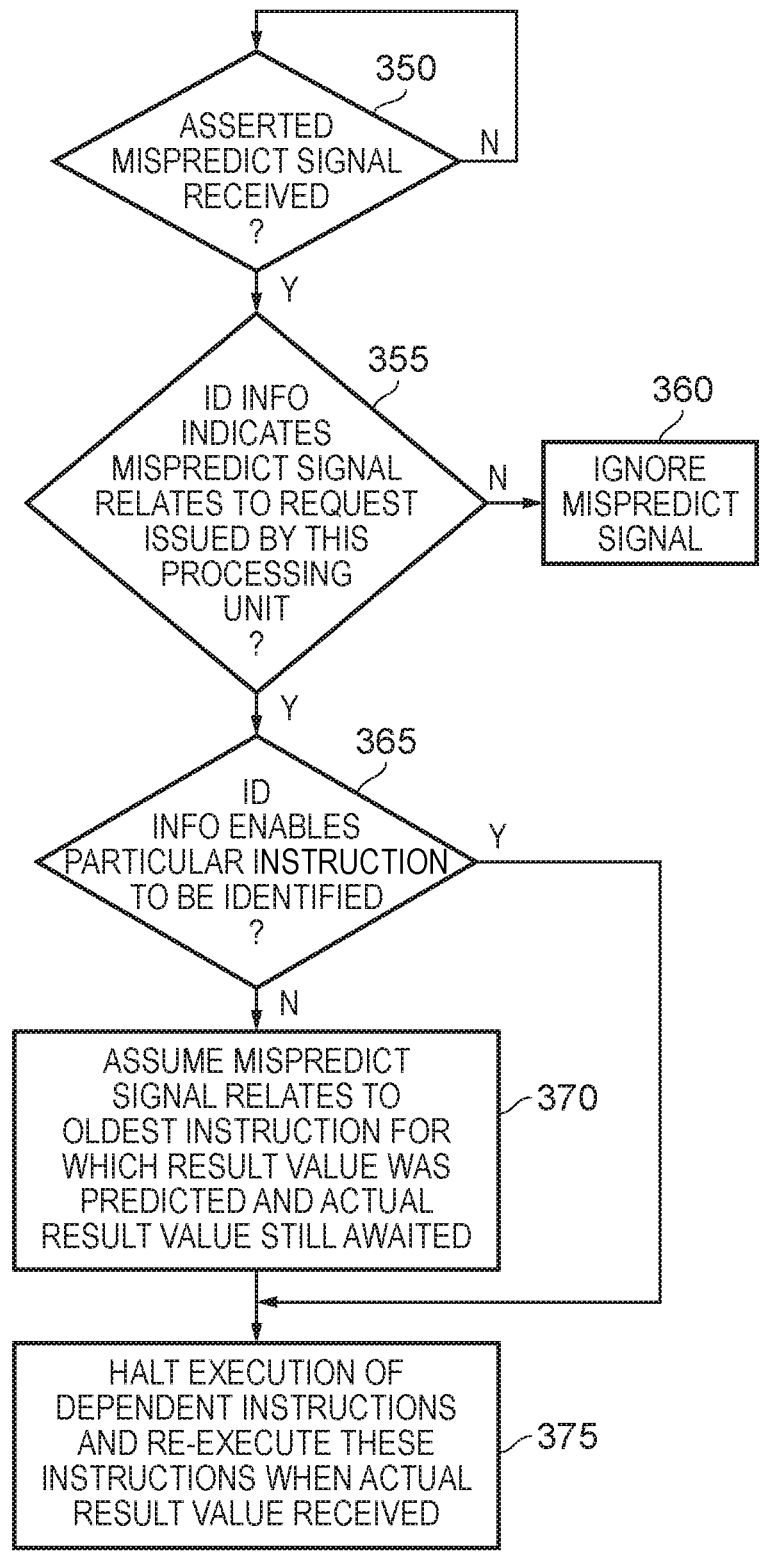
FIG. 6 is a flow diagram illustrating the operation of the processing unit on receipt of an asserted mispredict signal in accordance with one example.

FIG. 6 is a flow diagram illustrating the operation of the processing unit on receipt of an asserted mispredict signal. At step 350, the processing unit awaits receipt of an asserted mispredict signal, and then at step 355 it is determined whether the ID information included within the asserted mispredict signal relates to a request that this processing unit has issued. If not, then the mispredict signal is merely ignored at step 360.

However, otherwise the process proceeds to step 365 where it is determined whether the ID information enables a particular instruction to be identified. If not, for example because a single ID is used by the processing unit for all requests, then at step 370 an assumption is made about which request the mispredict signal relates to. A variety of schemes could be used here, but in the illustrated example it is assumed that the mispredict signal relates to the oldest instruction for which the result value is predicted, and for which the actual result value is still awaited.

The process then proceeds to step 375, where execution of dependent instructions for that identified instruction are halted, and those dependent instructions are then re-executed when the actual result value is received.

If at step 365 the ID information is sufficient to enable the particular instruction to be identified, then step 370 can be bypassed, and the process proceeds directly to step 375.

Figure 7:
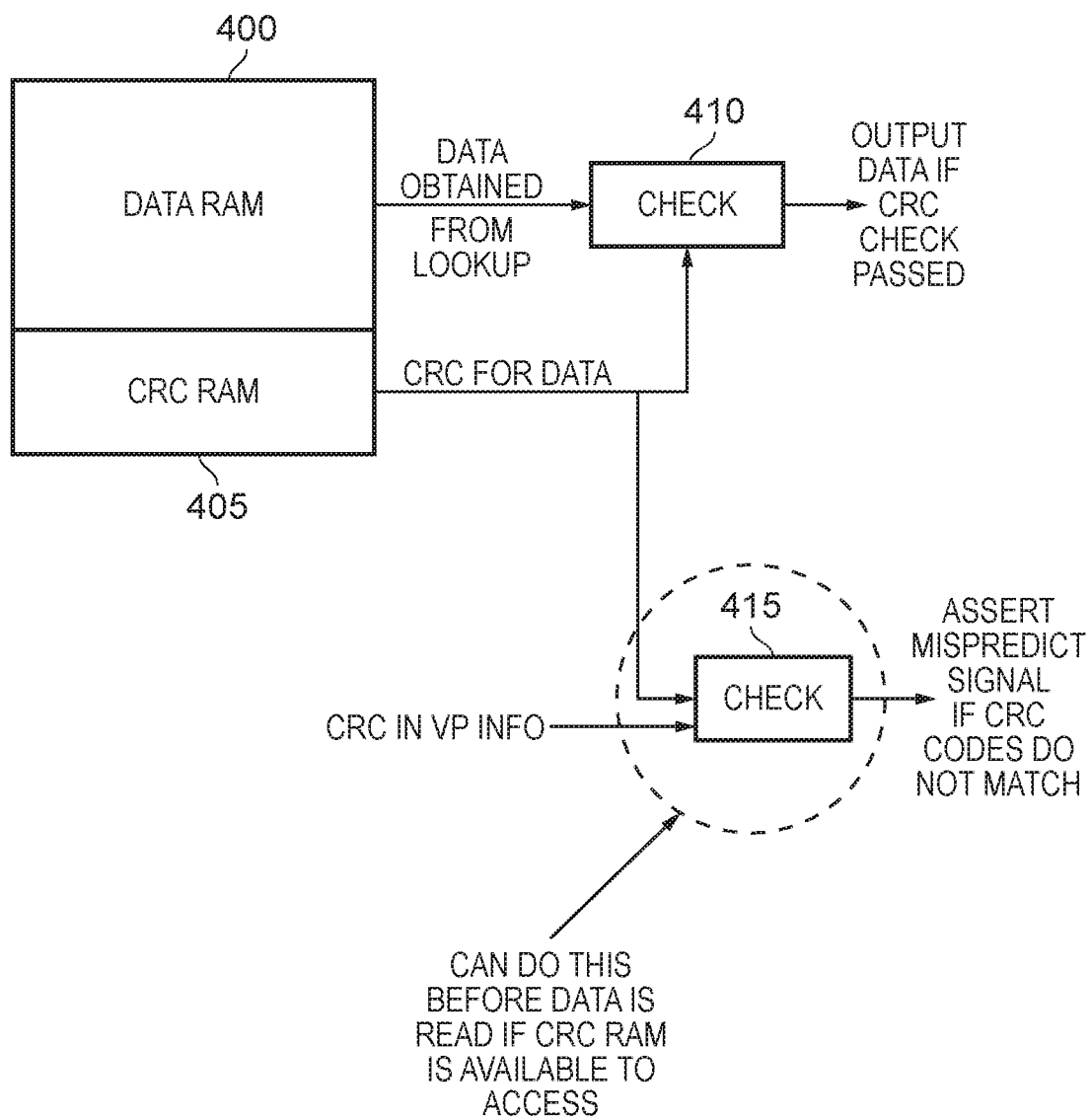
FIG. 7 illustrates how cyclic redundancy check (CRC) information already stored in association with data held in the memory hierarchy can be used when performing the value prediction check operation in situations where the signature value passed with the request includes a CRC code for the predicted result value, in accordance with one example arrangement.

FIG. 7 is a diagram schematically illustrating how CRC information already present within a level of the memory hierarchy can be used when performing the signature value check in accordance with the techniques described herein. In this example, it is assumed that a data RAM 400 at a particular level of the memory hierarchy also has an associated CRC RAM 405 for storing CRC codes in association with each of the data values stored. When a hit is detected within the data RAM, and the data obtained from the lookup is then read out, the associated CRC code is also output and input to a check stage 410 where it is determined whether the CRC code indicates that the data has not become corrupted. Assuming that the data is not corrupted, or if the data can be corrected using the CRC information, then the data is output to the processing unit. This is part of the normal operation of the cache structure.

However, as indicated by the check stage 415, the CRC code obtained from the CRC RAM 405 can also be output for checking against the CRC code provided as part of the VPinfo, so that in the event that the CRC codes differ, an asserted mispredict signal can be issued onto the mispredict signal transmission path. It should also be noted that this check stage 415 can potentially be performed before the data is actually read if the CRC RAM is available to access. In particular, both the data RAM and the CRC RAM may be accessed based on address, and hence if the address provided as part of the request matches with an address associated with an entry in the CRC RAM, then the CRC code can be output for the check process 415 to be performed, even if the data RAM access structures are not yet in a position to be able to perform the full data lookup.

Figure 8:
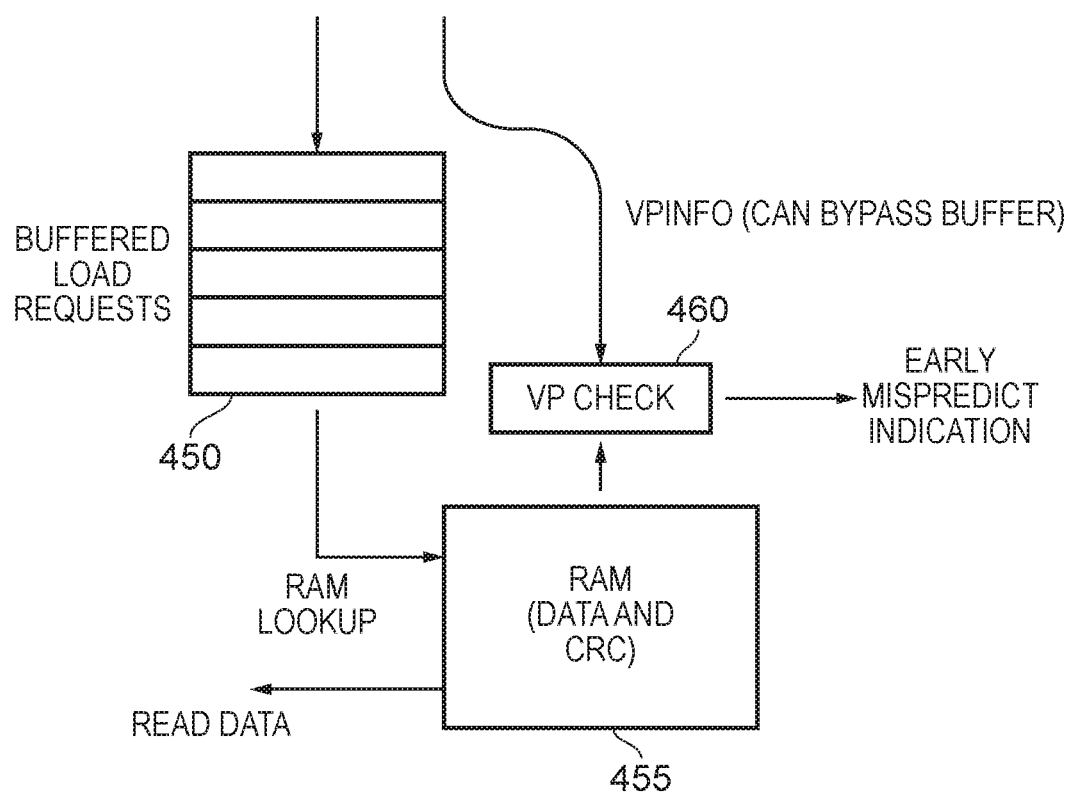
FIG. 8 illustrates how the value prediction check process may bypass buffered load requests in some instances, in order to further increase the speed with which an early mispredict indication can be made available to the processing unit.

This is illustrated schematically for one example implementation in FIG. 8, for a RAM structure 455 that includes a data RAM and CRC RAM. The load requests received from one or more of the processing units may be buffered within a buffer structure 450, and processed as and when the RAM structure is available to handle those load requests. For instance, the RAM structure may be arranged into various banks, and based on the address in the request, it can be determined which bank needs to be accessed. The load requests can then be processed in an order that makes most efficient access to the banks of RAM. However, it is not necessary for the value prediction check 460 to be held up and performed at the same time as the associated data access. In particular, the buffer structure 450 can be bypassed in some instances, for example where the necessary bank required to process the VP check is available. Hence, the VP check process 460 may be able to perform a lookup within the relevant CRC RAM of the necessary bank in order to obtain the CRC code to be compared with the CRC code in the VPinfo, and for the mispredict signal to be asserted dependent on the result of that comparison. This can result in an even earlier assertion of the mispredict signal than may otherwise be possible, further increasing the reductions in the mispredict penalty that could otherwise be incurred were the processing unit to have to await receipt of the actual result value before determining whether a misprediction has occurred.

From the above described examples, it will be seen that those examples provide an early mispredict interface from the result producing structure back to the processing unit. When the processing unit issues a request to the result producing structure, it can flag that the required value was predicted, and can provide a unique property of the predicted value, such as some form of CRC code or the predicted value itself. It can also provide ID information, which can be useful for example where the asserted mispredict signals are broadcast to multiple processing units and/or any individual processing unit may have more than one prediction on the fly. A mispredict signal transmission path/channel is also provided that can be used to inform the processing units when the prediction property has failed. The mispredict signal transmission path can be arranged to relax a number of properties. For example it can drop any individual response if necessary, it can be shared with several processing units, providing a broadcast type of interface, the arbitration employed within the transmission path can be simple (arranged to ignore all but one of the asserted signals), etc. Further, the mispredict signal can be a pessimistic response, in that there is no requirement to check the full predicted value, and it does not matter if occasionally it causes invalidation of some correct value prediction speculations.

It has been found that the use of such a mechanism can significantly reduce the prediction miss cost that can otherwise be incurred when using predicted result values.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
    a processing unit comprising processing circuitry to execute a sequence of instructions, and value prediction circuitry used to identify a predicted result value for at least one instruction;
    a result producing structure, responsive to a request issued from the processing unit when the processing circuitry is executing a first instruction, to produce a result value for said first instruction and return the result value to the processing unit;
    the processing unit being arranged, while waiting for the result value from the result producing structure, to cause the processing circuitry to speculatively execute at least one dependent instruction using a predicted result value for the first instruction as obtained from the value prediction circuitry;
    the request from the processing unit including a signature value indicative of the predicted result value, and the result producing structure being responsive to the signature value to detect a mispredict condition indicating that the predicted result value differs from the result value; and
    the apparatus providing a mispredict signal transmission path via which the result producing structure, when the mispredict condition is detected, is arranged to assert a mispredict signal for receipt by the processing unit prior to the result value being available to the processing unit.

2. An apparatus as claimed in claim 1, wherein the result producing structure comprises a plurality of stages where the signature value is analysed to determine whether the mispredict condition is detected, and the mispredict signal transmission path enables the mispredict signal to be asserted by any of those plurality of stages.

3. An apparatus as claimed in claim 2, wherein the mispredict signal transmission path is arranged to combine outputs from the plurality of stages to provide a single mispredict input to the processing unit.

4. An apparatus as claimed in claim 1, wherein the request from the processing unit includes an identifier value, and the asserted mispredict signal indicates the identifier value.

5. An apparatus as claimed in claim 1, wherein in the absence of the mispredict condition being detected, no response is provided to the processing unit over the mispredict signal transmission path.

6. An apparatus as claimed in claim 1, wherein the signature value is non-unique for the predicted result value, and assertion of the mispredict signal provides a misprediction hint to the processing unit.

7. An apparatus as claimed in claim 1, wherein the signature value is a cyclic redundancy check (CRC) code generated from the predicted result value, and the result producing structure is arranged to compare the CRC code included in the request with a CRC code for the result value in order to detect whether the mispredict condition is present.

8. An apparatus as claimed in claim 1, wherein the processing unit is arranged to execute a plurality of instructions for which the result value is to be produced by the result producing structure, and is arranged to speculatively execute dependent instructions for each of those plurality of instructions using associated predicted result values obtained from the value prediction circuitry.

9. An apparatus as claimed in claim 8, wherein the mispredict signal transmission path is arranged to allow one or more asserted mispredict signals to be suppressed in order to avoid conflict for use of at least a portion of the mispredict signal transmission path by multiple asserted mispredict signals.

10. An apparatus as claimed in claim 1, further comprising:
at one further processing unit comprising further processing circuitry to execute a sequence of instructions, and further value prediction circuitry used to identify a predicted result value for at least one instruction;
wherein the result producing structure is shared by the processing unit and the at least one further processing unit; and
the mispredict signal transmission path is arranged to assert mispredict signals to the processing unit and the further processing unit.

11. An apparatus as claimed in claim 10, wherein the mispredict signal transmission path comprises at least one path portion that is used to transmit an asserted mispredict signal irrespective of which of the processing unit and the at least one further processing unit is the intended recipient for that asserted mispredict signal.

12. An apparatus as claimed in claim 11, wherein each asserted mispredict signal is broadcast to each of the processing unit and at least one further processing unit.

13. An apparatus as claimed in claim 12, wherein an identifier included in the request received by the result producing structure is indicated in the asserted mispredict signal to enable each processing unit to determine whether that asserted mispredict signal is associated with a request issued by that processing unit.

14. An apparatus as claimed in claim 1, wherein the result producing structure is a memory hierarchy and the first instruction is a load instruction executed to load the result value from the memory hierarchy into a storage element of the processing unit.

15. An apparatus as claimed in claim 14, wherein the memory hierarchy comprises multiple levels, and one or more of the levels comprises analysis circuitry to seek to determine, with reference to the signature value, whether the mispredict condition is present.

16. An apparatus as claimed in claim 15, wherein said one or more of the levels comprises at least one of:
a level of cache; and
main memory.

17. An apparatus as claimed in claim 15, wherein for at least one level the analysis circuitry is arranged to selectively bypass buffer circuitry associated with pending load requests so as to enable an earlier detection to be made as to whether storage at that level holds the result value.

18. An apparatus as claimed in claim 1, wherein the result producing structure is computation circuitry used to perform an operation required by the first instruction.

19. An apparatus as claimed in claim 18, wherein the computation circuitry is a floating point unit used to perform floating point operations on behalf of the processing unit.

20. A method of using predicted result values in an apparatus having a processing unit comprising processing circuitry to execute a sequence of instructions, and value prediction circuitry used to identify a predicted result value for at least one instruction, comprising:
causing a result producing structure, responsive to a request issued from the processing unit when the processing circuitry is executing a first instruction, to produce a result value for said first instruction and return the result value to the processing unit;
while the processing unit is waiting for the result value from the result producing structure, causing the processing circuitry to speculatively execute at least one dependent instruction using a predicted result value for the first instruction as obtained from the value prediction circuitry;
including within the request from the processing unit a signature value indicative of the predicted result value;
causing the result producing structure to be responsive to the signature value to detect a mispredict condition indicating that the predicted result value differs from the result value; and
employing a mispredict signal transmission path via which the result producing structure, when the mispredict condition is detected, asserts a mispredict signal for receipt by the processing unit prior to the result value being available to the processing unit.

* * * * *